J. R. MOFFATT.

LOOPER CARRIER FOR SEWING MACHINES.

APPLICATION FILED JAN. 14, 1915.

Reissued Mar. 12, 1918. 14,445.

Witnesses

L. B. James

G. B. Wright

Inventor

James R. Moffatt

By Stewart and Mason

Attorneys

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

LOOPER-CARRIER FOR SEWING-MACHINES.

14,445. Specification of Reissued Letters Patent. Reissued Mar. 12, 1918.

Original No. 1,113,813, dated October 13, 1914, Serial No. 503,844, filed June 23, 1909. Application for reissue filed January 14, 1915. Serial No. 2,248.

*To all whom it may concern:*

Be it known that I, JAMES R. MOFFATT, a citizen of the United States, residing at Chicago, in the county of Cook, State of Illinois, have invented certain new and useful Improvements in Looper-Carriers for Sewing-Machines, of which the following is a description, reference being had to the accompanying drawing, and to the letters and figures of reference marked thereon.

My invention relates to new and useful improvements in looper carriers for sewing machines, and has for an object to provide a looper carrier with means whereby a plurality of loopers may be mounted therein and the loopers located close together.

A further object of the invention is to provide a looper carrier with means for supporting a plurality of loopers so that the beaks of the loopers are in substantially the same horizontal plane when entering the needle loops.

In the drawings which show by way of illustration one embodiment of my invention;

My improved looper carrier may be used in connection with any chain stitch machine, but is designed more especially for use in connection with the Union Special type of machine. The looper carrier is intended to be mounted on a looper rocker and is vibrated so that the loopers are given a forward and backward movement into and out of the needle loops and a lateral needle avoiding movement.

Figure 1:
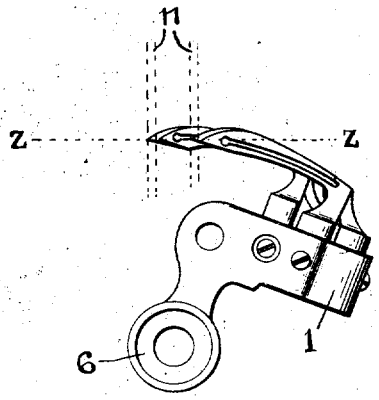
Figure 1 is a front view of the looper carrier with my improved means of supporting the loopers.

When four loopers are mounted in a looper carrier and each looper coöperates with a separate needle indicated by the line in Fig. 1, said loopers must necessarily be located very close together as the needles, if the looper is vibrated in a direction at right angles to the direction of the feed, must be set in a line or lines diagonal to the line of feed.

In order that the fabric may be readily manipulated, it is desirable that the line of the needles shall be as near as possible to a right line crossing the line of feed. In order that the loopers may be brought close together, I have provided a looper carrier 1, which has a plurality of sockets, 2, 3, 4 and 5 to receive the shanks of the loopers 1. The looper carrier is provided with the usual bearing 6, which may be mounted on a stud carried by the looper rocker. The manner of mounting the looper rocker is of the usual construction and will not need further description. The sockets 2 and 3 receive the rear pair of loopers. The centers of the sockets 2 and 3 are located in planes cutting the axis of the looper at right angles which are close together, but not coincident so that when the loopers 7 and 8 are fitted in said sockets 2 and 3, they will lie close together. The sockets 4 and 5 are disposed relative to the axis of the looper similar to the sockets 2 and 3 and are also located relative to the sockets 2 and 3 slightly at one side thereof. This staggered arrangement of the sockets of the loopers not only allows each looper of the pairs to be brought close together, but also allows the pairs of loopers to be brought close together.

Figure 2:
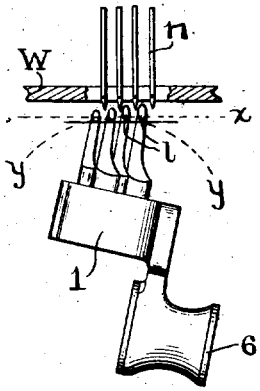
Fig. 2 is a view of the same looking at the beaks of the loopers.

It is desirable that the eyes of the needles should be arranged substantially the same distance from the work support and in order that the loopers may properly coöperate with the needles, the beaks of the loopers when entering the needle loops should be substantially in the same horizontal plane.

Where four loopers are set abreast and are vibrated laterally to avoid the needle in the arc of a circle indicated by the line $y$—$y$ Fig. 2, it will be readily seen that if the loopers are set so that one of the loopers or one pair of the loopers are in position to coöperate with the needles, the other loopers if arranged the same distance from the looper carrier, would not be in proper position to coöperate with the needles. This is due to the fact that the loopers are moving laterally in an arc of small radius, while the four looper cover considerable lateral space. It is objectionable to make two of the loopers of special construction so as to properly position the beaks of all the loopers for the reason that when the loopers are changed, there would be much confusion in selecting the right loopers for the proper sockets.

Figure 3:
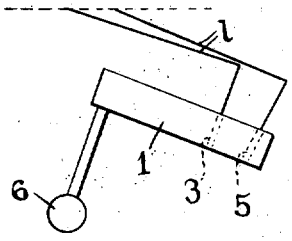
Fig. 3 is a diagrammatic view showing the manner of inclining one of the loopers relative to the other.
Figure 4:
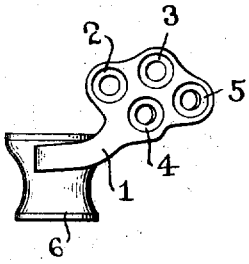
Fig. 4 is a top plan view of the looper carrier with the loopers removed.

I have found that by inclining the sockets 4 and 5 slightly relative to the sockets 2 and 3 as shown diagrammatically in Fig. 3, I am able to raise the beaks of the loopers of the front pair so that they will be properly located and lie in substantially the same horizontal plane (see line *z—z* Fig. 1 and line *x—x* Fig. 2) when the beaks of the loopers are entering the needle loops.

Figure 7:
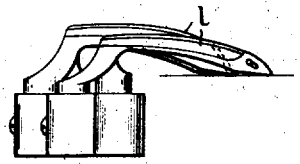
Fig. 7 is a side view of the loopers.

The essential feature is to properly locate the beak of the looper so that it will with certainty enter the needle loop and it is immaterial if the body portion of one pair of the loopers is inclined more than the other pair. By inclining the sockets of the front pair of loopers and by the staggered arrangement of sockets, I am able to bring my loopers close together and properly locate the beaks thereof so that they will with certainty enter the needle loops. The setting of the loopers 3 and 5 slightly in rear of the loopers 2 and 4 respectively, and the tilting of the loopers 4 and 5 relative to the loopers 2 and 3, will cause the extreme upper portions of the loopers which are nearest the work support, just before the loopers are moved laterally to lie in different horizontal planes as clearly shown in Figs. 2 and 7 of the drawings.

It is obvious from the construction described that the sockets for the respective looper shanks are so disposed relative to each other that lines tangential to the periphery of said sockets at the inner faces thereof and extending in a direction substantially at right angles to the longitudinal axis of the bearing 6 will respectively intersect the sockets.

Figure 6:
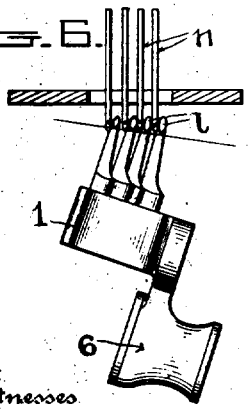
Fig. 6 is a view similar to Fig. 2 with the loopers moved laterally.
Figure 5:
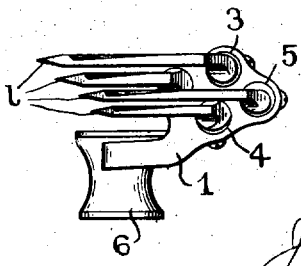
Fig. 5 is a similar view with the loopers in place.

In Fig. 2 the work support is indicated by W and it will be seen that the left hand looper is farther from the work support than the right hand looper. This arrangement of the loopers is of great advantage for the reason that when the loopers swing laterally to the position shown in Fig. 6, the left hand looper will not be moved up so as to strike the work support. This arrangement of the loopers would be of equal advantage where the loopers move close to any fixed element, as it gives ample room for the lateral swinging of the looper.

Having thus particularly described my invention, what I claim as new and desire to secure by Letters Patent is:

1. A looper carrier having a plurality of pairs of looper receiving sockets staggered relative to each other, whereby the pairs of loopers carried therein may be brought close together.

2. The combination of a looper carrier and a plurality of loopers supported thereon and arranged in parallel relation to each other, said carrier being formed with sockets for the respective looper shanks, the socket for the rearmost looper shank being staggered relative to the sockets for the looper shanks immediately in front thereof whereby the loopers carried therein may be brought close together.

3. A looper carrier provided with a plurality of sockets staggered relative to one another, the centers of which are arranged in separate parallel planes at right angles to the pivotal axis of the carrier, which planes are located close to each other.

4. A looper carrier for supporting a pair of loopers in close parallel relation, having a bearing and provided with sockets at their upper ends terminating in the same plane and for the respective looper shanks, said sockets being so disposed relative to each other that lines tangential to the peripheries of the said sockets at the inner faces thereof and extending in a direction substantially at right angles to the longitudinal axis of said bearing will respectively intersect the sockets.

5. A looper carrier for supporting a plurality of loopers in parallel relation, having a bearing and provided with sockets for the respective looper shanks, said sockets being so disposed relative to each other that parallel lines tangential to the periphery of one socket at opposite sides thereof and extending in a direction substantially at right angles to the longitudinal axis of the bearing will respectively intersect the sockets on opposite sides thereof.

6. A looper carrier provided with a plurality of sockets staggered relative to one another, the centers of which are arranged in separate parallel planes at right angles to the pivotal axis of the carrier, which planes are located close together, the center lines of said sockets being inclined relative to each other, whereby similar loopers mounted in said sockets may be positioned so that the beaks thereof are in substantially the same horizontal plane at the time of entering the needle loops.

7. A looper carrier having a plurality of fixed sockets formed therein, said sockets being located side by side and extending in the same general direction, a plurality of similar loopers mounted in said sockets and extending in substantially the same direction with their beaks side by side, said sockets also having their center lines inclined relative to each other, whereby said loopers are positioned so that the beaks thereof are in substantially the same horizontal plane at the time of entering the needle loops.

8. A looper carrier, a fixed element located on one side of said looper carrier, a plurality of loopers carried thereby, means to vibrate and rock said loopers and said carrier, said loopers having their extreme upper portions arranged at different distances from the axis of the looper carrier, whereby the loopers may be rocked in a direction opposite to their length and without interfering with said fixed element.

In testimony whereof, I affix my signature, in presence of two witnesses.

JAMES R. MOFFATT.

Witnesses:
GEORGE TATE,
R. TAUBERT.